United States Patent
Suzuki (10) Patent No.: US 10,495,280 B2
(45) Date of Patent: Dec. 3, 2019

(54) VEHICLE HEADLAMP

(71) Applicant: Ichikoh Industries, Ltd., Isehara-shi (JP)

(72) Inventor: Eiji Suzuki, Isehara (JP)

(73) Assignee: Ichikoh Industries, Ltd., Isehara-shi (JP)

(*) Notice: Subject to any disclaimer, the term of this patent is extended or adjusted under 35 U.S.C. 154(b) by 0 days.

(21) Appl. No.: 15/774,437

(22) PCT Filed: Nov. 9, 2016

(86) PCT No.: PCT/JP2016/083295
§ 371 (c)(1),
(2) Date: May 8, 2018

(87) PCT Pub. No.: WO2017/082322
PCT Pub. Date: May 18, 2017

(65) Prior Publication Data
US 2018/0328560 A1    Nov. 15, 2018

(30) Foreign Application Priority Data

Nov. 9, 2015  (JP) .................................. 2015-219810

(51) Int. Cl.
*F21S 41/33* (2018.01)
*F21S 41/147* (2018.01)
(Continued)

(52) U.S. Cl.
CPC ............... *F21S 41/33* (2018.01); *B60Q 1/04* (2013.01); *F21S 41/147* (2018.01);
(Continued)

(58) Field of Classification Search
CPC ........ F21S 41/33; F21S 41/147; F21S 41/255; F21S 41/00; B60Q 1/04; B60Q 2200/30; F21Y 2115/10
(Continued)

(56) References Cited

U.S. PATENT DOCUMENTS

2012/0008335 A1* 1/2012 Yamamoto ............ F21S 41/147
                                                              362/539

FOREIGN PATENT DOCUMENTS

EP         2541135 A2 *  1/2013  ............ F21S 41/338
JP         2-90401 A     3/1990
(Continued)

OTHER PUBLICATIONS

International Search Report dated Feb. 14, 2017, in PCT/JP2016/083295 filed Nov. 9, 2016.
(Continued)

*Primary Examiner* — Karabi Guharay
*Assistant Examiner* — Jessica M Apenteng
(74) *Attorney, Agent, or Firm* — Oblon, McClelland, Maier & Neustadt,, L.L.P.

(57) ABSTRACT

A light source, a reflector, and a projection lens, the reflector including a first reflective surface and a second reflective surface. The first reflective surface includes a first focal point and a second focal point positioned near a lens focal point. The second reflective surface includes a first focal point and a second focal point positioned on a light-emitting surface side relative to the lens focal point. The system provides a high beam light distribution pattern having a hot zone in the center.

16 Claims, 4 Drawing Sheets

(51) Int. Cl.
*F21S 41/255* (2018.01)
*B60Q 1/04* (2006.01)
*F21S 41/686* (2018.01)
*F21S 41/148* (2018.01)
*F21Y 115/10* (2016.01)
*F21W 102/135* (2018.01)

(52) U.S. Cl.
CPC ........... *F21S 41/148* (2018.01); *F21S 41/255* (2018.01); *F21S 41/333* (2018.01); *F21S 41/686* (2018.01); *B60Q 2200/30* (2013.01); *F21W 2102/135* (2018.01); *F21Y 2115/10* (2016.08)

(58) Field of Classification Search
USPC ........................................................ 362/509
See application file for complete search history.

(56) References Cited

FOREIGN PATENT DOCUMENTS

| | | |
|---|---|---|
| JP | 2012-195248 A | 10/2012 |
| JP | 2014-10968 A | 1/2014 |
| JP | 2015-76243 A | 4/2015 |
| JP | 2015-118754 A | 6/2015 |

OTHER PUBLICATIONS

International Search Report dated Feb. 14, 2017 in PCT/JP2016/083295, 2 pages.

* cited by examiner

VEHICLE HEADLAMP

TECHNICAL FIELD

The present invention relates to a projector type vehicle headlamp.

BACKGROUND ART

Vehicle headlamps of this type are conventionally known (e.g., see Patent Literature 1). A related-art vehicle headlamp includes a light source, a first reflector, a second reflector as an additional reflector, and a projection lens. In the related-art vehicle headlamp, light from the light source is reflected on the first reflector and the second reflector, and the reflected light is radiated to the front as a first light distribution pattern and a second light distribution pattern through a projection lens. The first light distribution pattern and the second light distribution pattern overlap each other and form a high-beam light distribution pattern (a travel light distribution pattern).

CITATION LIST

Patent Literature

Patent Literature 1: Japanese Unexamined Patent Application Publication No. 2015-118754

SUMMARY OF THE INVENTION

Problems to be Solved by the Invention

For such a vehicle headlamp, obtaining a high-beam light distribution pattern having a hot zone (the highest luminous intensity area or the highest luminance area) at a center of the screen is important. The screen is a virtual vertical screen disposed 25 m forward of the vehicle headlamp. The center of the screen is an intersection of a vertical line from the top to the bottom of the screen and a horizontal line from the left to the right of the screen.

An object of the present invention is to provide a vehicle headlamp capable of obtaining a high-beam light distribution pattern having a hot zone at the center of a screen.

Means for Solving the Problems

In a first aspect of the present invention, a vehicle headlamp includes a light source having a light-radiating surface that radiates light, a reflector having a reflection surface that reflects the light from the light-radiating surface, and a lens having a lens focal point, wherein the reflection surface is a reflection surface based on a spheroid and is divided into a first reflection surface and a second reflection surface, the first reflection surface includes a first focal point located on or near the light-radiating surface and a second focal point located on or near the lens focus, the second reflection surface includes a first focal point located on or near the light-radiating surface and a second focal point located on the light-radiating surface side with respect to the lens focal point, and the lens radiates reflected light from the first reflection surface the front through the lens as a first light distribution pattern, and radiates reflected light from the second reflection surface to the front through the lens as a second light distribution pattern partially overlapping a part of the first light distribution pattern.

In a second aspect of the present invention, in the first aspect, the lens has a lens optical axis, and the light-radiating surface faces the first reflection surface and the second reflection surface via the lens optical axis.

In a third aspect of the present invention, in the first aspect, the first reflection surface is located on the lens side with respect to the second reflection surface, and a boundary part between the first reflection surface and the second reflection surface is located on the lens side with respect to the vertical line of the light-radiating surface.

In a fourth aspect of the present invention, in the first aspect, the second reflection surface is convex toward the light-radiating surface with respect to the first reflection surface.

In a fifth aspect of the present invention, in the first aspect, a vehicle headlamp further includes a movable shade arranged between the lens and the light-radiating surface, the first reflection surface and the second reflection surface, and a switching mechanism configured to switch the movable shade between a first position and a second position, wherein, when located in the first position, the movable shade shields a part of the reflected light from the first reflection surface and the reflected light from the second reflection surface and causes a remaining part of the reflected light from the first reflection surface to be incident on the lens and, when located in the second position, the movable shade, the movable shade causes the reflected light from the first reflection surface and the reflected light from the second reflection surface to be incident on the lens.

Effect of the Invention

The vehicle headlamp according to the present invention can provide a vehicle headlamp capable of obtaining a high-beam light distribution pattern having a hot zone at a center of a screen.

MODE FOR CARRYING OUT THE INVENTION

Figure 1:
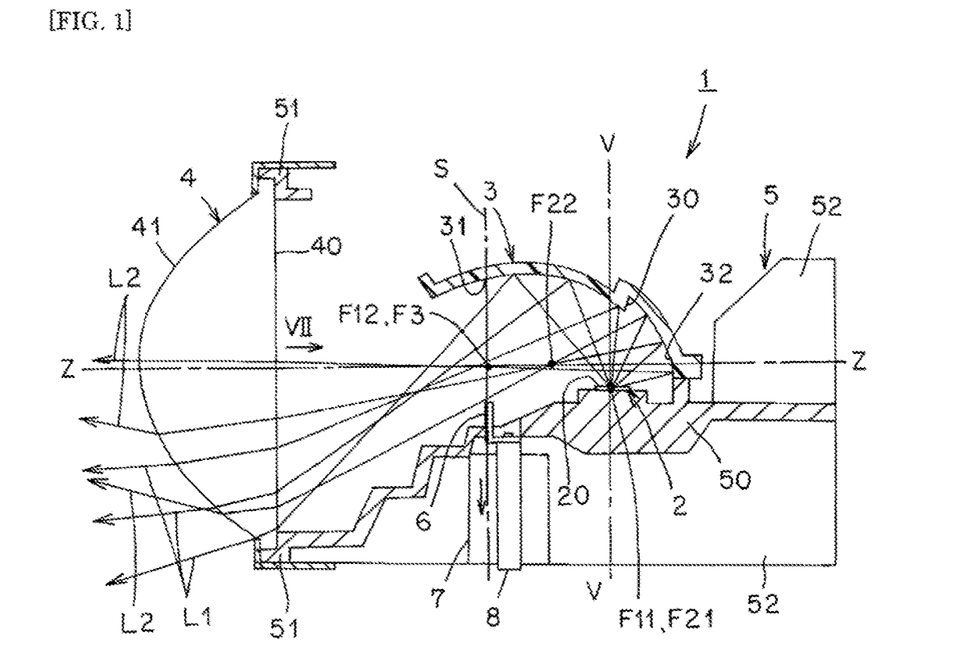
FIG. 1 illustrates a first embodiment of a vehicle headlamp according to the present invention, and is a schematic cross-sectional view in the longitudinal direction (a schematic cross-sectional view in the vertical direction) of a lamp unit when a movable shade is located in a second position.
Figure 2:
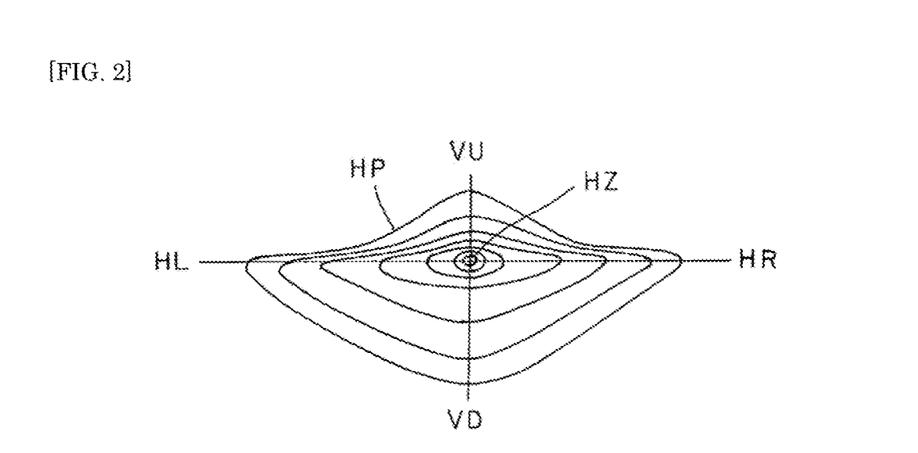
FIG. 2 is a view for explaining a high-beam light distribution pattern radiated from a lamp unit when the movable shade is located in the second position.
Figure 3:
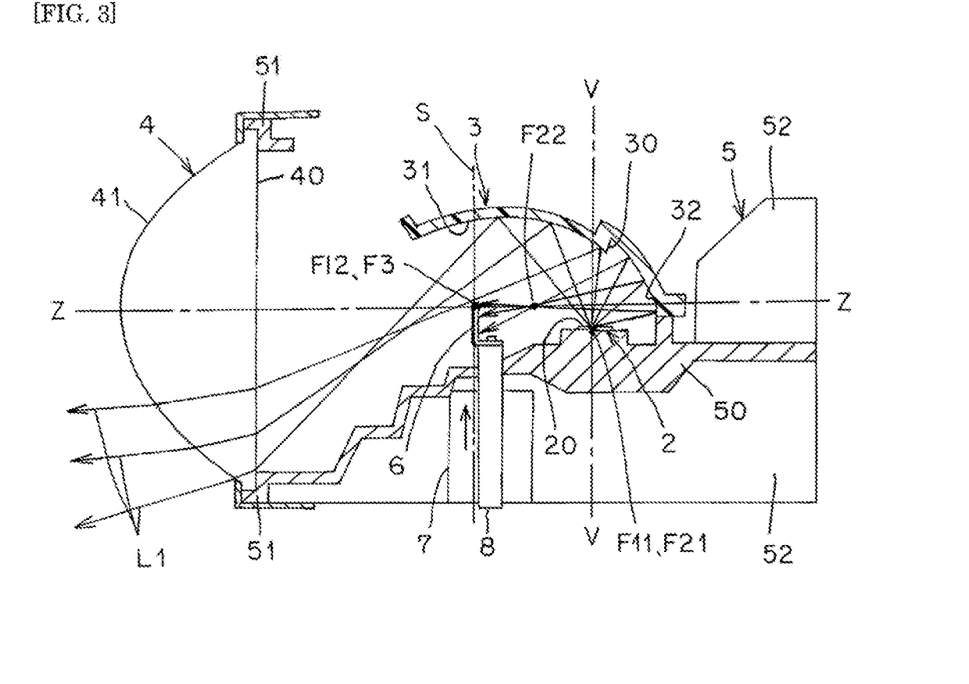
FIG. 3 is a schematic cross-sectional view in the longitudinal direction of the lamp unit when the movable shade is located in a first position.
Figure 8:
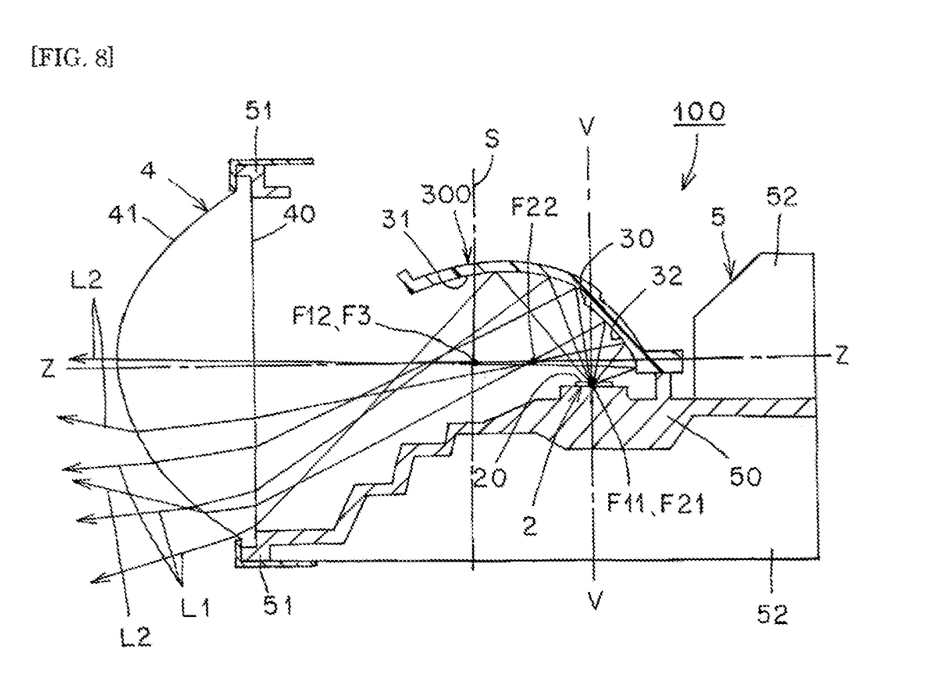
FIG. 8 is a schematic cross-sectional view in the longitudinal direction of a lamp unit illustrating a second embodiment of the vehicle headlamp according to the present invention.

Below, two examples of the embodiments (exemplary examples) of a vehicle headlamp according to the present invention will be described in detail with reference to the drawings. In FIG. 1, FIG. 3, and FIG. 8, a semiconductor light source, a projection lens, a movable shade, a solenoid of a switching device, and a power transmission member are not hatched. In FIG. 2, and FIG. 4 to FIG. 6, the reference code "VU-VD" designates a vertical line from the top to the bottom of a screen. The reference code "HL-HR" designates a horizontal line from the left to the right of the screen. In each of the iso-intensity lines of FIG. 2, and FIG. 4 to FIG. 6, a central part is a light curve with high luminous intensity, and an outer part is a light curve of which luminous intensity decreases toward the outsides. In the specification and attached claims, the terms "front", "rear", "top", "bottom", "left" and "right" respectively designate the front, rear, top, bottom, left and right in when a vehicle headlamp according to the present invention is mounted on a vehicle.

Description of Structures of First Embodiment

FIG. 1 to FIG. 7 illustrate the first embodiment of the vehicle headlamp according to the present invention. Below, a structure of a vehicle headlamp according to the first embodiment will be described. In this example, for example, a headlamp of a vehicle headlamp will be described.
(Description of Vehicle Headlamp 1)

In FIG. 1, the reference numeral 1 denotes a vehicle headlamp according to the first embodiment. The vehicle headlamp 1 is provided on the left and right sides, respectively, at the front of a vehicle. As illustrated in FIG. 1, the vehicle headlamp 1 includes a lamp housing (not illustrated), a lamp lens (not illustrated), a semiconductor light source 2 as a light source, a reflector 3, a projection lens 4 as a lens, a heat sink member 5, a movable shade 6, a solenoid 7 of a switching mechanism, and a power transmission member 8.

The lamp housing and the lamp lens (e.g., a transparent outer lens) define a lamp chamber (not illustrated). The semiconductor light source 2, the reflector 3, the projection lens 4, the heat sink member 5, the movable shade 6, the solenoid 7 and the power transmission member 8 form a projector type lamp unit. The lamp units 2, 3, 4, 5, 6, 7, and 8 are arranged in the lamp chamber, and are attached to the lamp housing via an optical axis adjustment mechanism for the up-down direction (not illustrated) and an optical axis adjustment mechanism for the left-right direction (not illustrated).

Note that, lamp units other than the lamp units 2, 3, 4, 5, 6, 7, and 8, e.g., a clearance lamp unit, a turn signal lamp unit, and a daytime running lamp unit, may be arranged in the lamp chamber. Also, an inner panel (not illustrated), an inner housing (not illustrated), and an inner lens (not illustrated) may be arranged in the lamp chamber.
(Description of Heat Sink Member 5)

For example, the heat sink member 5 is formed by a material of high thermal conductivity, e.g., resin or metal die-casting (aluminum die-casting). The semiconductor light source 2, the reflector 3, the projection lens 4, the solenoid 7 and the power transmission member 8 are attached to the heat sink member 5. The heat sink member 5 functions both as a heat radiation member and as an attaching member.

The heat sink member 5 includes a planar part 50, a ring part 51, and a plurality of fin parts 52. The semiconductor light source 2, the reflector 3, the solenoid 7, and the power transmission member 8 are attached to the planar part 50. The projection lens 4 is attached to the ring part 51. Note that the ring part 51 may be a separated member from the heat sink member 5 and may be attached to the heat sink member 5.
(Description of Semiconductor Light Source 2)

The semiconductor light source 2 is, for example, a self-radiation semiconductor light source, such as an LED, an OEL, or an OLED (an organic EL). The semiconductor light source 2 is attached to the planar part 50 of the heat sink member 5 via a holder (not illustrated) or a screw (not illustrated), for example. A current from a lightning circuit (not illustrated) is supplied to the semiconductor light source 2.

The semiconductor light source 2 includes a light-radiating surface 20 that radiates light. In this example, the light-radiating surface 20 faces upward and is rectangular in shape. The longitudinal direction of the light-radiating surface 20 orthogonality or substantially orthogonality crosses the left-right direction of a lens optical axis Z of the projection lens 4.
(Description of Reflector 3)

The reflector 3 is formed by, for example, a material of high thermal resistance and a non-light transmissive material, such as resin members. The reflector 3 is attached to the planar part 50 of the heat sink member 5 with a screw (not illustrated), and the like.

The reflector 3 is hollow of which front part and lower part are open and rear part, upper part, and left and right parts are closed. Reflection surfaces 31 and 32 each formed as a free-form curved surface based on a spheroid are provided on the concave inner surface at the closed part of the reflector 3. The reflection surfaces 31 and 32 reflect light from the light-radiating surface 20 toward the movable shade 6 and the projection lens 4. The reflection surfaces 31 and 32 are provided on the upper side of the lens optical axis Z in the spheroid with the lens optical axis Z as a rotation axis.

The light-radiating surface 20 faces the reflection surfaces 31 and 32 in the up-down direction via the lens optical axis Z. That is, the light-radiating surface 20 is located below the lens optical axis Z. The reflection surfaces 31 and 32 are located on the upper side of the lens optical axis Z.
(Description of First Reflection Surface 31 and Second Reflection Surface 32)

Figure 7:
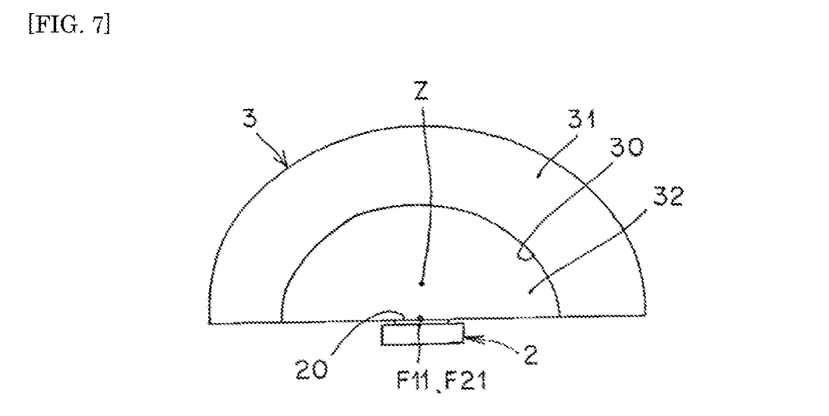
FIG. 7 is a schematic front view illustrating a light source, and a first reflection surface and a second reflection surface of a reflector (a view along an arrow VII of FIG. 1).

The reflection surfaces 31 and 32 are divided into the first reflection surface 31 and the second reflection surface 32. Between the first reflection surface 31 and the second reflection surface 32, a stepped boundary part 30 is formed. The first reflection surface 31 includes a first focal point F11 located at or near a center of the light-radiating surface 20, and a second focal point F12 located at or near a lens focal point F3 of the lens 4, and on the projection lens 4 side with respect to the lens focal point F3. The second reflection surface 32 includes a first focal point F21 located at or near a center of the light-radiating surface 20, and a second focal point F22 located on the light-radiating surface 20 side with respect to the lens focal point F3.

Each of the first reflection surface 31 and the second reflection surface 32 is a free-form curved surface based on a spheroid. Therefore, strictly speaking, a plurality of first focal points F11 and F21 and a plurality of second focal points F12 and F22 exist, instead of a single F11, F21, F12, and F22 exist. However, since distances among the focal points are significantly short, each of a group of the focal points may be considered as a single focal point.

The first reflection surface 31 is located on the projection lens 4 side with respect to the second reflection surface 32. That is, the first reflection surface 31 is provided to extend from the boundary part 30 to the open front part of the reflector 3. The second reflection surface 32 is provided to extend from the boundary part 30 to the closed rear part of the reflector 3. The boundary part 30 is located on the rear side of the reflector 3 (on the opposite side of the projection lens 4) with respect to a vertical line V of the light-radiating surface 20.

The second reflection surface 32 is concave outward (on the side opposite to the light-radiating surface 20) with respect to the first reflection surface 31. Therefore, the stepped surface of the boundary part 30 is not visible through the projection lens 4 from the front side of the lamp unit. This avoids reflected light reflected on the stepped surface of the boundary part 30 penetrating through the projection lens 4 and being radiated to the front.

The first reflection surface 31 and the second reflection surface 32 make the light from the light-radiating surface 20 reflected to the projection lens 4 side. Reflected light from the first reflection surface 31 converges onto the second focal point F12, is radiated from the second focal point F12 and is incident on the projection lens 4. Reflected light from the second reflection surface 32 converges (crosses) onto the second focal point F22 and is radiated from the second focal point F22 and is incident on the projection lens 4.

(Description of Projection Lens 4)

For example, the projection lens 4 is a lens made of resin, such as PC, PMMA, and PCO. That is, the light radiated from the light-radiating surface 20 of the semiconductor light source 2 does not have heat of high temperature, and a resin lens may be used as the projection lens 4. The projection lens 4 is attached to the ring part 51 of the heat sink member 5. The projection lens 4 may be attached to the heat sink member 5 using the heat sink member 5 and a separately provided holder instead of the ring part 51.

The projection lens 4 has the lens focal point (the rear-side lens focal point) F3, the lens optical axis Z, and a meridional image surface S which is a focal surface on the object space side is provided. The lens focal point F3 is located at an intersection of the lens optical axis Z and the meridional image surface S. The projection lens 4 is a projection lens based on an aspheric surface. Therefore, strictly speaking, a plurality of lens focal points F3, lens optical axes Z, and meridional image surfaces S exist, respectively instead of a single lens focal point F3, a single lens optical axis Z, and a single meridional image surface S exist. However, since distances among the focal points, among the optical axes, and among the image surfaces are significantly short, the focal points, the optical axes, and the image surfaces may be considered as a single focal point, a single optical axis, and a single image surface.

The projection lens 4 is formed by an incident surface 40 on the rear side and a radiation surface 41 on the front side. The incident surface 40 faces the reflector 3. The incident surface 40 is formed as a planar surface or an aspheric substantially planar surface (convex or concave with respect to the reflector 3). The radiation surface 41 is an aspheric convex surface.

Figure 4:
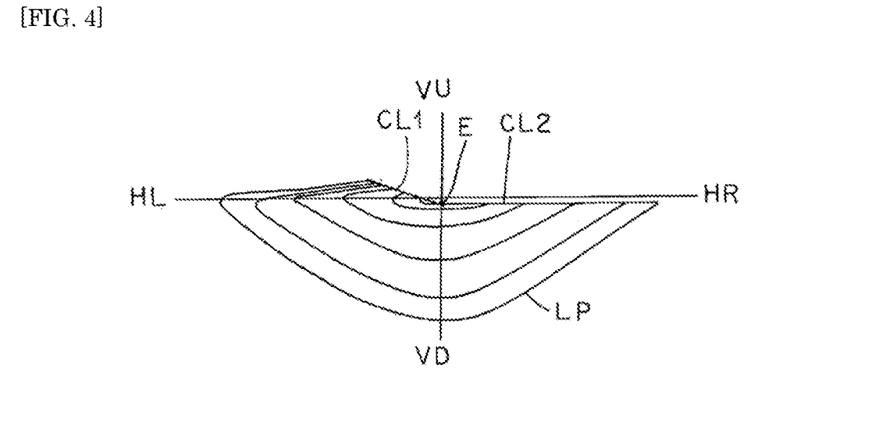
FIG. 4 is a view for explaining a low-beam light distribution pattern (a light distribution pattern for passing) radiated by the lamp unit when the movable shade is located in the first position.

Light from the light-radiating surface 20, which is the reflected light from the reflection surfaces 31 and 32, is radiated through the projection lens 4 to the outside, i.e., to the front of the vehicle as radiation light L1 and L2. That is, the reflected light from the first reflection surface 31 is radiated to the front through the projection lens 4 as a first light distribution pattern P1 (see FIG. 5). The reflected light from the second reflection surface 32 is radiated to the front through the projection lens 4 as the second light distribution pattern P2 (see FIG. 6) which partially overlaps a part of the first light distribution pattern P1. Therefore, a high-beam light distribution pattern HP illustrated in FIG. 2 and a low-beam light distribution pattern LP illustrated in FIG. 4 are radiated to the front of the vehicle through the projection lens 4.

(Description of First Light Distribution Pattern P1 and Second Light Distribution Pattern P2)

Figure 5:
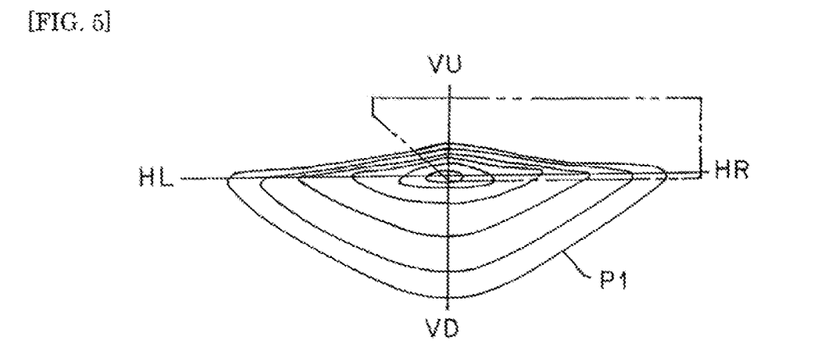
FIG. 5 is a view for explaining a first light distribution pattern formed by a first reflection surface and a lens.
Figure 6:
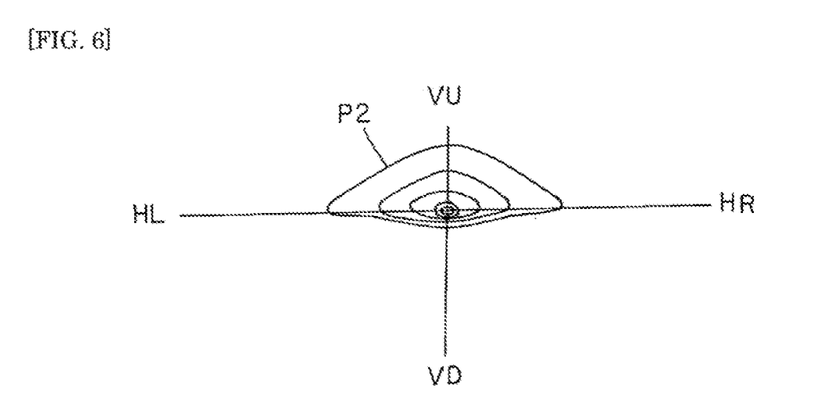
FIG. 6 is a view for explaining a second light distribution pattern formed by a second reflection surface and a lens.

The first light distribution pattern P1 and the second light distribution pattern P2 radiated through the projection lens 4 are the reflected light from the first reflection surface 31 and the second reflection surface 32, and are formed by an aggregate of a large number of projection images (not illustrated) of the light-radiating surface 20. The projection images of the first light distribution pattern P1 and the second light distribution pattern P2 are projection images inverted in the up-down direction and the left-right direction with respect to the lens optical axis Z and the lens focal point F3 when the projection images pass through the meridional image surface S.

Here, the second focal point F12 of the first reflection surface 31 is located at or near the lens focal point F3, and on the projection lens 4 side with respect to the lens focal point F3. The second focal point F22 of the second reflection surface 32 is located on the light-radiating surface 20 side with respect to the lens focal point F3.

Therefore, the reflected light from the first reflection surface 31 (a beam of light depicted by a solid arrow) passes through the meridional image surface S while converging onto the second focal point F12 as illustrated in FIG. 1 and FIG. 3. Therefore, the distance between light beams of the reflected light from the first reflection surface 31 passing through the meridional image surface S increases toward upward with respect to the lens optical axis Z and the lens focal point F3. Therefore, in the first light distribution pattern P1 which is the reflected light from the first reflection surface 31 and is radiated through the projection lens 4, the iso-intensity line is dense in the upper part and less dense in the lower part as illustrated in FIG. 5.

The reflected light from the second reflection surface 32 (a beam of light depicted by a solid arrow) converges (crosses) onto the second focal point F22 as illustrated in FIG. 1, and passes through the meridional image surface S while being radiated from the second focal point F22. Therefore, the distance between light beams of the reflected light from the second reflection surface 32 passing through the meridional image surface S increases toward downward with respect to the lens optical axis Z and the lens focal point F3 when the reflected light is inverted in the up-down direction from the reflected light from the first reflection surface 31. Therefore, in the second light distribution pattern P2 which is the reflected light from the second reflection surface 32 and is radiated through the projection lens 4, the iso-intensity line is less dense in the upper part and dense in the lower part as illustrated in FIG. 6.

The upper part of the first light distribution pattern P1 in which the iso-intensity line is dense and the lower part of the second light distribution pattern P2 in which the iso-intensity line is dense overlap each other and form the high-beam light distribution pattern HP. The high-beam light distribution pattern HP includes a hot zone HZ at a center of the screen (the intersection of the vertical line from the top to the bottom of the screen (VU-VD) and the horizontal line from the left to the right of the screen (HL-HR)).

(Description of Solenoid 7)

The solenoid 7 is attached to the planar part 50 of the heat sink member 5 by a screw, for example (not illustrated). The solenoid 7 moves the movable shade 6 to a first position (a position illustrated in FIG. 3) and a second position (a position illustrated in FIG. 1) via a plunger (not illustrated) and the power transmission member 8 and keeps at the moved position.

(Description of Movable Shade 6)

The movable shade 6 is formed by a non-light transmissive member, and, in this example, a sheet metal. The movable shade 6 is attached to the plunger of the solenoid 7 via the power transmission member 8. The movable shade 6 is formed by press-drawing a sheet metal. The movable shade 6 is disposed between the semiconductor light source 2 and the projection lens 4.

When the movable shade 6 is located in the first position, all the reflected light from the second reflection surface 32 and a part of the reflected light from the first reflection surface 31 (a part surrounded by a two-dot chain line in FIG. 6) are shielded (cutoff). Then, an unshielded remaining part of the reflected light from the first reflection surface 31 is made to be incident on the incident surface 40 of the projection lens 4. Therefore, the low-beam light distribution pattern LP illustrated in FIG. 4 is radiated to the front of the vehicle. The low-beam light distribution pattern LP has an upper-edge oblique cutoff line CL1, an upper-edge horizontal cutoff line CL2, and an elbow point E.

When the movable shade 6 is located in the second position, all of the reflected light from the first reflection surface 31 and all of the reflected light from the second reflection surface 32 are made to be incident on the incident surface 40 of the projection lens 4. This causes the high-beam light distribution pattern HP illustrated in FIG. 2 to be radiated to the front of the vehicle.

(Description of Power Transmission Member 8)

The power transmission member 8 is attached to the movable shade 6 and the plunger of the solenoid 7. The power transmission member 8 includes a link member, a spring member, and the like. The power transmission member 8 transmits power of the solenoid 7 to the movable shade 6. Note that the power transmission member 8 and the movable shade 6 may be integrated with each other.

Description of Operations of First Embodiment

The vehicle headlamp 1 according to the first embodiment has structures described above and, operations thereof will be described below.

The light-radiating surface 20 of the semiconductor light source 2 is turned on to radiate light. Then the light radiated from the up-faced light-radiating surface 20 is reflected on the projection lens 4 side as the reflected light on the first reflection surface 31 and the second reflection surface 32 of the reflector 3. Here, when the movable shade 6 is driven by the solenoid 7 and is located in the second position via the power transmission member 8, all of the reflected light from the first reflection surface 31 and all of the reflected light from the second reflection surface 32 travel toward the projection lens 4. The reflected light that has travelled toward the projection lens 4 is incident on the projection lens 4 from the incident surface 40 of the projection lens 4 and is radiated to the front of the vehicle from the radiation surface 41 of the projection lens 4 as the high-beam light distribution pattern HP (radiation light L1 and L2).

That is, the reflected light from the first reflection surface 31 is radiated to the front as the first light distribution pattern P1 (radiation light L1). The reflected light from the second reflection surface 32 is radiated to the front as the second light distribution pattern P2 (radiation light L2). The upper part of the first light distribution pattern P1 and the lower part of the second light distribution pattern P2 overlap each other and form the high-beam light distribution pattern HP illustrated in FIG. 2. The high-beam light distribution pattern HP has the hot zone HZ at the center of the screen.

Here, driving of the solenoid 7 is stopped, and the movable shade 6 is moved to the first position from the second position via the power transmission member 8, and is kept in the first position. Then, all of the reflected light from the second reflection surface 32 not shielded by the movable shade 6 and a part of the reflected light from the first reflection surface 31 (the part surrounded by a two-dot chain line in FIG. 5) is covered by the movable shade 6. Then, remaining part of the reflected light from the first reflection surface 31 that is not shielded by the movable shade 6 located in the first position travels toward the projection lens 4. The reflected light that has travelled toward the projection lens 4 is incident on the projection lens 4 from the incident surface 40 of the projection lens 4 and is radiated to the front of the vehicle from the radiation surface 41 of the projection lens 4 as the low-beam light distribution pattern LP (radiation light L1).

Description of Effects of First Embodiment

The vehicle headlamp 1 according to the first embodiment has the structures and operations described above and, effects thereof will be described below.

The vehicle headlamp 1 according to the first embodiment can provide a vehicle headlamp that provides a high-beam light distribution pattern HP having a hot zone HZ at the center of a screen. Below, detailed description will be given.

The vehicle headlamp 1 according to the first embodiment is a projector type vehicle headlamp. Therefore, the projection images of the first light distribution pattern P1 and the second light distribution pattern P2 radiated through the projection lens 4 (the projection images of the light-radiating surface 20) are the reflected light from the first reflection surface 31 and the second reflection surface 32, and are projection images inverted in the up-down direction and the left-right direction with respect to the lens optical axis Z and the lens focal point F3 when the projection images pass through the meridional image surface S.

Also, in the vehicle headlamp 1 according to the first embodiment, the second focal point F12 of the first reflection surface 31 is located at or near the lens focal point F3 and on the projection lens 4 side with respect to the lens focal point F3. Therefore, the reflected light from the first reflection surface 31 (a beam of light depicted by a solid arrow) passes through the meridional image surface S while converging onto the second focal point F12 as illustrated in FIG. 1 and FIG. 3. Therefore, the distance between light beams of the reflected light from the first reflection surface 31 passing through the meridional image surface S increases toward upward with respect to the lens optical axis Z and the lens focal point F3. Therefore, in the first light distribution pattern P1 which is the reflected light from the first reflection surface 31 and is radiated through the projection lens 4, the iso-intensity line is dense in the upper part and less dense in the lower part as illustrated in FIG. 5.

In the vehicle headlamp 1 according to the first embodiment, the second focal point F22 of the second reflection surface 32 is located on the light-radiating surface 20 side with respect to the lens focal point F3. Therefore, the reflected light from the second reflection surface 32 (a beam of light depicted by a solid arrow) passes through the meridional image surface S while converging (crossing) onto the second focal point F22 and radiating from the second focal point F22 as illustrated in FIG. 1. Therefore, the distance between light beams of the reflected light from the second reflection surface 32 passing through the meridional image surface S increases toward downward with respect to the lens optical axis Z and the lens focal point F3 when the reflected light is inverted in the up-down direction from the reflected light from the first reflection surface 31. Therefore, in the second light distribution pattern P2 which is the reflected light from the second reflection surface 32 and is radiated through the projection lens 4, the iso-intensity line is less dense in the upper part and dense in the lower part as illustrated in FIG. 6.

As a result, in the vehicle headlamp 1 according to the first embodiment, the upper part of the first light distribution pattern P1 in which the iso-intensity line is dense and the lower part of the second light distribution pattern P2 in which the iso-intensity line is dense overlap each other. Therefore, the vehicle headlamp 1 according to the first embodiment can provide a high-beam light distribution pattern HP having a hot zone HZ at the center of a screen.

Here, the vehicle headlamp 1 according to the first embodiment will be compared with a vehicle headlamp of general projector type to which the present invention is not applied. As in the vehicle headlamp 1 according to the first embodiment, a vehicle headlamp of general projector type has an up-faced light-radiating surface, and a reflection surface located on an upper side of a lens optical axis in a spheroid with the lens optical axis being a rotation axis. For this reason, it is difficult to dispose a vehicle headlamp of general projector type to be arrange a light distribution pattern above the horizontal line HL-HR of the screen.

In contrast, in the vehicle headlamp 1 according to the first embodiment, the reflection surface is divided into the first reflection surface 31 and the second reflection surface 32, and the second focal point F22 of the second reflection surface 32 is located on the light-radiating surface 20 side with respect to the lens focal point F3. Therefore, in the vehicle headlamp 1 according to the first embodiment, as described above, dense/less-dense in the iso-intensity line in the first light distribution pattern P1 in the up-down direction and dense/less-dense in the iso-intensity line in the second light distribution pattern P2 in the up-down direction are inverted in the up-down direction. Then, the upper part of the first light distribution pattern P1 in which the iso-intensity line is dense and the lower part of the second light distribution pattern P2 in which the iso-intensity line is dense overlap each other. Therefore, the vehicle headlamp 1 according to the first embodiment can reliably and easily provide a high-beam light distribution pattern HP having a hot zone HZ at the center of a screen.

In the vehicle headlamp 1 according to the first embodiment, the light-radiating surface 20 faces the reflection surfaces 31 and 32 via the lens optical axis Z. That is, in the vehicle headlamp 1 according to the first embodiment, the light-radiating surface 20 is located on the lower side of the optical axis Z. Therefore, in the vehicle headlamp 1 according to the first embodiment, as compared with a vehicle headlamp in which a light-radiating surface is located at substantially the same position as the lens optical axis, reflected light that is reflected from the second reflection surface 32 and cannot be incident on the projection lens 4 can be reduced, and reflected light that can be incident on the projection lens 4 can be increased.

That is, as illustrated in FIG. 1, the reflected light from the second reflection surface 32 passes through the meridional image surface S and is incident on the projection lens 4 while converging (crossing) onto the second focal point F22 and radiating from the second focal point F22. At this time, of the reflected light that is reflected from the second reflection surface 32 and is radiated from the second focal point F22, reflected light separated from the lens optical axis Z (reflected light below the lens optical axis Z) may not be able to enter the projection lens 4. Also, a lower part of the reflected light of the reflected light radiated from the second focal point F22 is separated downward from the lens optical axis Z as the light-radiating surface 20 approaches the lens focal point F3. Therefore, an amount of the reflected light that cannot be incident on the projection lens 4 increases. On the other hand, a lower part of the reflected light of the reflected light radiated from the second focal point F22 approaches the lens optical axis Z and is located on the upper side of the lens optical axis Z as the light-radiating surface 20 is separated from the lens focal point F3 and is located on the lower side of the lens focal point F3. Therefore, an amount of the reflected light that can be incident on the projection lens 4 increases.

As described above, in the vehicle headlamp 1 in the first embodiment, the light-radiating surface 20 is located on the lower side of the lens optical axis Z. Therefore, as compared with a vehicle headlamp in which a light-radiating surface is located at substantially the same position as the lens optical axis, reflected light that is reflected from the second reflection surface 32 and cannot be incident on the projection lens 4 can be reduced, and reflected light that can be incident on the projection lens 4 can be increased.

Also, in the vehicle headlamp 1 according to the first embodiment, the reflected light that cannot be incident on the projection lens 4 is reflected light that forms a lower part of the reflected light that passes through the meridional image surface S and an upper part of the second light distribution pattern P2 in which the iso-intensity line is less dense. On the other hand, in the vehicle headlamp 1 according to the first embodiment, the reflected light that can be incident on the projection lens 4 is reflected light that forms an upper part of the reflected light that passes through the meridional image surface S and a lower part in which the iso-intensity line is dense in the second light distribution pattern P2. Therefore, in the vehicle headlamp 1 according to the first embodiment, the reflected light that forms the upper part of which the iso-intensity line is less dense in the second light distribution pattern P2 cannot be incident on the projection lens 4, but the reflected light that forms the lower part of which the iso-intensity line is dense in the second light distribution pattern P2 can be incident on the projection lens 4. Therefore, in the vehicle headlamp 1 according to the first embodiment, the light from the light-radiating surface 20, which is the reflected light from the second reflection surface 32 can be used effectively.

The vehicle headlamp 1 according to the first embodiment includes the movable shade 6, the solenoid 7, and the power transmission member 8. Therefore, in the vehicle headlamp 1 according to the first embodiment, the high-beam light distribution pattern HP and the low-beam light distribution pattern LP can be switchably radiated to the front of the vehicle.

In the vehicle headlamp 1 according to the first embodiment, the boundary part 30 between the first reflection surface 31 and the second reflection surface 32 is located on the rear side of the reflector 3, i.e., on the opposite side of the projection lens 4 with respect to the vertical line V of the light-radiating surface 20, and on the near side of the second reflection surface 32. Therefore, the vehicle headlamp 1 according to the first embodiment can adjust an area of the first reflection surface 31 to be wide. Therefore, an amount of light of the low-beam light distribution pattern LP can be adjusted to be significantly large. Note that, in the vehicle headlamp 1 according to the first embodiment, by adjusting the position of the boundary part 30 and adjusting an area of the first reflection surface 31 and an area of the second reflection surface 32, an amount of light of the second light distribution pattern P2 of the high-beam light distribution pattern H P and an amount of light of the low-beam light distribution pattern LP can be adjusted.

In the vehicle headlamp 1 according to the first embodiment, the second reflection surface 32 is concave outward with respect to the first reflection surface 31, i.e., concave on the side opposite to the light-radiating surface 20. Therefore, in the vehicle headlamp 1 according to the first embodiment, the stepped surface of the boundary part 30 is not visible through the projection lens 4 from the front side of the lamp unit. This avoids, in the vehicle headlamp 1 according to the first embodiment, penetrating reflected light reflected on the stepped surface of the boundary part 30 through the projection lens 4 and being radiated to the front.

Description of Structures, Operations, and Effects of Second Embodiment

FIG. 8 illustrates a second embodiment of the vehicle headlamp according to the present invention. In FIG. 8, the same reference numerals as those in FIG. 1 to FIG. 7 each designate the same part. Below, structures, operations, and effects of the vehicle headlamp 100 of the second embodiment will be described.

The vehicle headlamp 1 according to the first embodiment includes the movable shade 6, the solenoid 7, and the power transmission member 8, and in which the high-beam light distribution pattern HP and the low-beam light distribution pattern LP are switchably radiated to the front of a vehicle. In contrast, the vehicle headlamp 100 according to the second embodiment does not include a movable shade 6, a solenoid 7, and a power transmission member 8, and radiates only the high-beam light distribution pattern HP to the front of a vehicle.

In the vehicle headlamp 100 according to the second embodiment, in a reflector 300, a boundary part 30 between a first reflection surface 31 and a second reflection surface 32 is located on the front side of the reflector 3 with respect to the vertical line V of a light-radiating surface 20, i.e., on the near side of the projection lens 4. Therefore, in the vehicle headlamp 100 according to the second embodiment, an area of the second reflection surface 32 can be adjusted to be wide. Therefore, an amount of light of a second light distribution pattern P2 of a high-beam light distribution pattern HP can be adjusted to be large. Note that, in the vehicle headlamp 100 according to the second embodiment, by adjusting the position of the boundary part 30 and adjusting an area of the first reflection surface 31 and an area of the second reflection surface 32, an amount of light of the second light distribution pattern P2 of the high-beam light distribution pattern HP and an amount of light of a low-beam light distribution pattern LP can be adjusted.

In the vehicle headlamp 100 according to the second embodiment, the second reflection surface 32 is convex inward with respect to the first reflection surface 31, i.e., convex on the light-radiating surface 20 side. Therefore, in the vehicle headlamp 100 according to the second embodiment, light from the light-radiating surface 20, which is reflected light reflected on the boundary part 30, can be effectively used for the formation of the high-beam light distribution pattern HP.

Description of Examples Other than First and Second Embodiments

Note that, in the first and the second embodiments, the first reflection surface 31 and the second reflection surface 32 are formed by a single segment. In the present invention, however, the first reflection surface 31 and the second reflection surface 32 may be formed by a plurality of segments.

Note that the present invention is not limited by the first and the second embodiments described above.

DESCRIPTION OF REFERENCE NUMERALS 1, 100 Vehicle headlamp
2 Semiconductor light source
20 Light-radiating surface
3, 300 Reflector
30 Boundary part
31 First reflection surface
32 Second reflection surface
4 Projection lens
40 Incident surface
41 Radiation surface
5 Heat sink member
50 Planar part
51 Ring part
52 Fin part
6 Movable shade
7 Solenoid
8 Power transmission member
CL1 Oblique cutoff line
CL2 Horizontal cutoff line
E Elbow point
F11, F21 First focal point
F12, F22 Second focal point
F3 Lens focal point
HL-HR Horizontal line
HP High-beam light distribution pattern
HZ Hot zone
LP Low-beam light distribution pattern
P1 First light distribution pattern
P2 Second light distribution pattern
S Meridional image surface
V Vertical line
VU-VD Vertical line from top to bottom
Z Lens optical axis

The invention claimed is:
1. A vehicle headlamp, comprising:
a light source having a light-radiating surface that radiates light;
a reflector having a reflection surface that reflects the light from the light-radiating surface; and
a lens having a substantially single focal point, wherein the reflection surface is a reflection surface based on a spheroid and is divided into a first reflection surface and a second reflection surface so that the first reflection surface is located on the lens side with respect to the second reflection surface in a direction of an optical axis of the lens, the first reflection surface includes a first focal point located on or near the light-radiating surface and a second focal point located on or near the focal point of the lens, the second reflection surface includes a first focal point located on or near the light-radiating surface and a second focal point located between the light-radiating surface and the focal point of the lens in the direction of the optical axis of the lens, and the lens radiates reflected light from the first reflection surface and reflected light from the second reflection surface to the front respectively as a first light distribution pattern and a second light distribution pattern partially overlapping a part of the first light distribution pattern.

2. The vehicle headlamp according to claim 1, wherein the lens has a lens optical axis, and the light-radiating surface faces the first reflection surface and the second reflection surface via the lens optical axis.

3. The vehicle headlamp according to claim 1, wherein a boundary part between the first reflection surface and the second reflection surface is located on the lens side with respect to the vertical line of the light-radiating surface.

4. The vehicle headlamp according to claim 1, wherein the second reflection surface is convex toward the light-radiating surface with respect to the first reflection surface.

5. The vehicle headlamp according to claim 1, further comprising
a movable shade arranged between the lens and the light-radiating surface, the first reflection surface and the second reflection surface, and
a switching mechanism configured to switch the movable shade between a first position and a second position, wherein
when located in the first position, the movable shade shields a part of the reflected light from the first reflection surface and the reflected light from the second reflection surface and causes a remaining part of the reflected light from the first reflection surface to be incident on the lens and,
when located in the second position, the movable shade causes the reflected light from the first reflection surface and the reflected light from the second reflection surface to be incident on the lens.

6. A vehicle headlamp, comprising:
a light source comprising a light-radiating surface configured to radiate a light;
a reflector comprising a reflection surface configured to reflect the light, the reflection surface comprising a first reflection surface and a second reflection surface coupled to the first reflection surface via a stepped boundary part; and
a lens comprising a lens focal point, wherein:
the first reflection surface has a first focal point located on or near the light-radiating surface and a second focal point located on or near the lens focal point,
the second reflection surface has a first focal point located on or near the light-radiating surface and a second focal point located between the light-radiating surface and the lens focal point,
the lens comprises an incident surface which receives light reflected by the reflection surface of the reflector and a radiation surface which radiates the light received by the incident surface,
the incident surface receives a first reflected light from the first reflection surface and a second reflected light from the second reflection surface, the radiation surface radiates the received first reflected light as a first light distribution pattern and the received second reflected light as a second light distribution pattern at least partially overlapping the first light distribution pattern, and the second focal point of the first reflection surface and the second focal point of the second reflection surface are positioned between the reflection surface of the reflector and the light-radiating surface in a direction of a vertical line of the light-radiating surface.

7. The vehicle headlamp according to claim 6, wherein: the lens has a substantially single lens optical axis.

8. The vehicle headlamp according to claim 6, further comprising:
a heat sink member comprising a first portion to which the light source is attached,
wherein the reflector is attached to a second portion of the heat sink member such that the second reflection surface is positioned between the first reflection surface and the second portion of heat sink.

9. The vehicle headlamp according to claim 6,
wherein the stepped boundary part is located on a side of the lens with respect to the vertical line of the light-radiating surface.

10. The vehicle headlamp according to claim 6,
wherein the stepped boundary part is convex inward with respect to the first reflection surface.

11. A vehicle headlamp, comprising:
a heat sink comprising at least a ring part;
a light source mounted on a portion of the heat sink other than the ring part and comprising a light-radiating surface configured to radiate a light;
a reflector comprising a reflection surface configured to reflect light from the light source, the reflection surface comprising a first reflection surface and a second reflection surface arranged so that a first end side thereof is coupled to an end side of the first reflection surface via a boundary part and a second end side thereof is attached to the second portion of the heat sink; and
a lens mounted on the ring part, the lens arranged to have a substantially single lens optical axis arranged to be located between the light-radiating surface of the light source and the reflection surface of the reflector which faces the light-radiating surface of the light source, wherein:
the lens comprises an incident surface which receives light reflected by the reflection surface of the reflector and a radiation surface which radiates the light received by the incident surface,
the incident surface receives a first reflected light from the first reflection surface and a second reflected light from the second reflection surface,
the radiation surface radiates the received first reflected light as a first light distribution pattern and the received second reflected light as a second light distribution pattern at least partially overlapping the first light distribution pattern.

12. The vehicle headlamp according to claim 11, wherein:
the lens comprises a lens focal point,
the first reflection surface has a first focal point located on or near the light-radiating surface and a second focal point located on or near the lens focal point,
the second reflection surface has a first focal point located on or near the light-radiating surface and a second focal point located between the light-radiating surface and the lens focal point in a direction of the substantially single lens optical axis, and
the second focal point of the first reflection surface and the second focal point of the second reflection surface are positioned between the light-radiating surface of the light source and the reflection surface of the reflector in a direction of a vertical line of the light-radiating surface.

13. The vehicle headlamp according to claim 11, wherein:
the lens comprises a single lens focal point,
the first reflection surface comprises at least a focal point located on or near the single lens focal point, and
the second reflection surface comprises at least a focal point located between the light-radiating surface and the single lens focal point in a direction of the substantially single lens optical axis.

14. The vehicle headlamp of claim 11, wherein:
the boundary part is of a stepped shape which comprises a first end and a second end and is concaved outward in this order with respect to the first reflection surface,
the first end of the boundary part couples to the end side of the first reflection surface, and
the second end of the boundary part couples to the first end side of the second reflection surface.

15. The vehicle headlamp of claim 11, wherein:
the boundary part is of a stepped shape which comprises a first end and a second end and is convex inward in this order with respect to the first reflection surface,
the first end of the boundary part couples to the end side of the first reflection surface, and
second end of the boundary part couples to the first end side of the second reflection surface.

16. The vehicle headlamp of claim 11, further comprising:
a shade; and
a power transmission member to drive the shade, the power transmission member being attached to the heat sink.

* * * * *